E. WITZENMANN.
END CONNECTION FOR METALLIC HOSE PIPES.
APPLICATION FILED NOV. 30, 1909.
959,187.  Patented May 24, 1910.
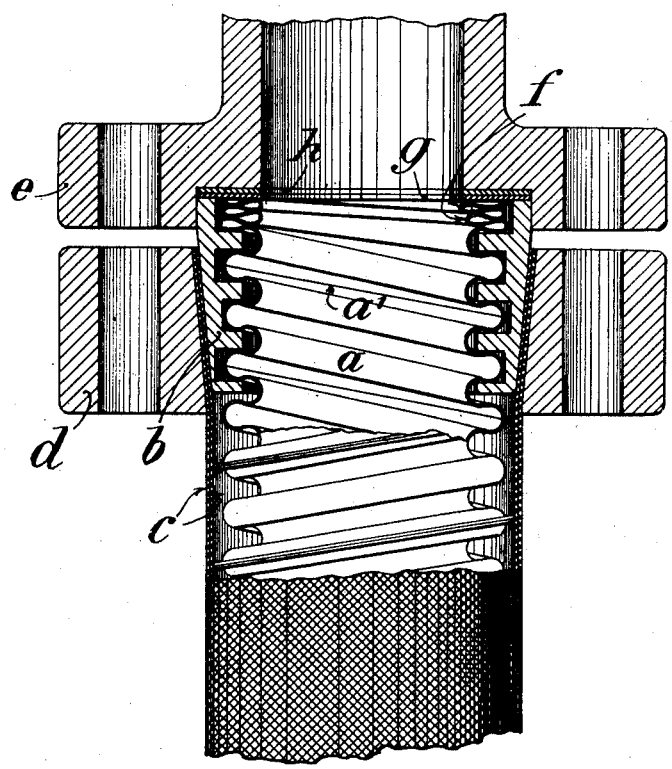
Witnesses:
P. F. Nagle.
L. Douville.
Inventor:
Emil Witzenmann
by Wiedersheim & Fairbanks
Attorneys.

UNITED STATES PATENT OFFICE.

EMIL WITZENMANN, OF PFORZHEIM, GERMANY.

END CONNECTION FOR METALLIC HOSE-PIPES.

959,187.      Specification of Letters Patent.      Patented May 24, 1910.

Application filed November 30, 1909. Serial No. 530,532.

*To all whom it may concern:*

Be it known that I, EMIL WITZENMANN, a subject of the Grand Duke of Baden, residing at Pforzheim, Germany, have invented certain new and useful Improvements in End Connections for Metallic Hose-Pipes, of which the following is a specification.

This invention relates to an end connection for spirally wound metallic hose made from metal bands of suitable profile.

Under my invention I provide an end connection which is specially suitable for welded metallic hose in which the edges of the profile metal band are autogenously welded together and it consists in autogenously welding a ring shaped metal plate to the end of the metal hose so that it forms a seat or bearing for the packing which is in a known manner pressed between the end connecting pieces.

The special end connection as made under this invention has the advantage of being both simple and cheap.

In order that my invention may be clearly understood I have appended an explanatory drawing which shows partly in longitudinal section an end connection made in accordance with my invention.

$a$ designates the spiral metal hose the butting sections $a$ of which are autogenously welded together at $a^1$.

$b$ designates the conical muff or collar which is screwed over the end of the hose.

$c$ designates a protecting-gauze which is secured in a known manner by means of the flanges $e$ and $d$ and screws, bolts or such like.

To the end surface of the metal hose $a$ a ring shaped plate $g$ is secured by autogenous welding. Between the plate $g$ and the flange $e$ packing $h$ is inserted, and by screwing or bolting the flanges $e$ and $d$ together the packing $h$ is pressed together so as to form a tight joint. If this end connection is applied to a welded spiral metallic hose it is necessary to make the hose so that the end next to the end connection lies in a plane at right angles to the longitudinal axis of the hose. For this purpose and under this invention the last two screw threads of the hose are compressed or squeezed together, as shown on the drawing. The squeezing together of the last two screw threads is not absolutely necessary, as the plate $g$ which is to be autogenously welded to the end of the spiral hose may also be secured thereto by cutting the end of the hose square before welding.

Having now fully described my invention what I claim and desire to secure by Letters Patent is:—

An end connection for a spiral metallic hose pipe comprising, in combination, a pipe end, the spirals of which are compressed together so as to form a square end, a muff and a ring shaped metal plate welded to the squared end of the pipe.

In testimony whereof I affix my signature in presence of two witnesses.

EMIL WITZENMANN.

Witnesses:
     G. CHARLES,
     HERMANN KRÖNER.